United States Patent [19]

Wesolowski

[11] Patent Number: 5,121,267
[45] Date of Patent: Jun. 9, 1992

[54] APPARATUS AND METHOD FOR CONTROLLING AN AUDIO PLAYBACK SIGNAL AT VARIABLE TAPE SPEED

[75] Inventor: Jan S. Wesolowski, Redwood City, Calif.

[73] Assignee: Ampex Corporation, Redwood City, Calif.

[21] Appl. No.: 540,023

[22] Filed: Jun. 14, 1990

[51] Int. Cl.$^5$ .................... G11B 5/035; G11B 5/02
[52] U.S. Cl. ................................. 360/65; 360/67
[58] Field of Search ...................... 360/13, 65, 67, 27

[56] References Cited

PUBLICATIONS

VPR-300 Series Video Production Recorder (VPR) Service Manual, vol. I, and VPR-300 Series VPR Operation Manual, Ampex Corporation, Aug. 1989. FIG. 1 of applicant's drawings.
VPR-300 Series Video Production Recorder Service Manual, vols. I and II, Catalog No. 1520528-02, issued by Ampex Corporation, Redwood City, California, Aug. 1989.

Primary Examiner—Aristotelis Psitos
Assistant Examiner—Won Tae C. Kim
Attorney, Agent, or Firm—Elizabeth E. Strnad; Richard J. Roddy

[57] ABSTRACT

An apparatus and method are provided for controlling the level of an audio output signal which has been recorded and is played back from a magnetic tape at a low or zero tape speed, such as utilized in jog mode or variable speed playback during editing. A gain control signal is provided to eliminate a disturbing repetitive audio signal which accompanies stop motion playback and to reduce that signal level at low tape speed playback. The gain control signal is made dependent on the magnitude of tape speed, and it is applied to adjust the audio output gain of the playback channel.

11 Claims, 2 Drawing Sheets

APPARATUS AND METHOD FOR CONTROLLING AN AUDIO PLAYBACK SIGNAL AT VARIABLE TAPE SPEED

The invention relates generally to playback of audio information signals recorded on parallel tracks extending across a length of a magnetic tape, utilizing audio and/or video signal tape recording/playback devices, having one or more playback heads scanning the parallel tracks, and more particularly to such playback within a predetermined range of low tape speed.

BACKGROUND OF THE INVENTION

In analog video tape recording and reproducing devices where analog video signals are recorded on parallel tracks extending across a length of a magnetic tape, for example helical tracks, it is known to record the analog audio signal by a stationary transducer along a longitudinal track. During editing, the tape may be moved in either a forward or reverse direction typically by manually rotating the tape reels, or the capstan, or a control knob located on the control panel. During such operation mode, generally referred to as jog mode, the tape speed is dependent on the rotational speed of the knob, while the audio signal is being reproduced from the tape by a stationary playback head. The pitch of the reproduced sound changes with the speed of the relative head-to-tape movement. During the jog mode, reproduction of the audio signal facilitates edit decision making by the operator. The operator listens to the reproduced sound and recognizes portions of the spoken words or music, which enable him to make edit decisions at accurately selected locations on tape. Before making an edit, such as a cut, insert, or a mark on the tape, the operator manually stops the tape at a desired location by any of the above-described means. As it is well known in the art of magnetic recording and playback, when there is no relative transducer-to-tape movement, there is no signal reproduced from the tape. Therefore, when the tape is stopped, the stationary heads do not reproduce any audio signal. The resulting silence is a desirable feature for the editor at stop motion playback.

In digital video tape recorders, as well as in certain types of analog video tape recorders, both the video and audio signals are recorded on helical tracks by one or more rotating heads. One such example are video tape recorders having audio signals recorded as frequency modulated carrier signals. Because of the high rotational speed of the heads relative to the tape speed, the head-to-tape speed is not influenced significantly by changing the longitudinal tape speed. Consequently, the pitch of the reproduced audio signal, which is dependent on that relative speed, remains substantially constant with the changing longitudinal tape speed. When the tape is stopped, for example during editing, the playback head continues to rotate over the same helical track, or groups of tracks, whereby it reproduces over and over again a portion of the audio signal that is recorded on that particular track or tracks. This annoys the editing operator, who has to listen to a relatively loud short fragment of audio signal which is being continuously repeated. Generally it would be possible to obtain silence by manually turning off the audio amplifier, but such operation must be repeated every time after the tape is stopped, and the amplifier has to be turned on again when tape motion is resumed. It is apparent that such an additional repetitive manual operation would significantly slow down the editing process, and therefore it is not useful.

Similarly, during slower than normal tape speed, each recorded track or group of tracks is scanned more than once, and thereby each audio portion is repetitively reproduced, resulting in a similar undesirable audio experience for the editor.

Accordingly, it is an object of the present invention to provide an apparatus and method which would eliminate the undesirable audio signal automatically when the tape is stopped, and reduce the level of that signal when the tape is moving at a selected slow speed, for example below normal tape speed at which the recording was made.

Briefly, in accordance with the method of the present invention, an audio playback signal is reproduced utilizing an audio playback channel. A gain control signal is provided as being dependent on the magnitude of the longitudinal tape speed, and it is utilized to adjust an audio output gain of the audio playback channel as follows.

At zero tape speed the gain control signal reduces the audio output gain to zero. When the tape speed magnitude is changing from zero to a predetermined magnitude, the gain control signal changes the audio output gain in the same direction. When the magnitude of the tape speed exceeds that predetermined magnitude, the gain control signal has a constant value.

In accordance with the preferred method of the invention, a gain control factor is calculated, which has a zero value at zero tape speed, and it increases with an increasing magnitude of the tape speed, up to a predetermined tape speed magnitude. When the magnitude of tape speed exceeds the predetermined magnitude, the gain control factor is equal to a predetermined constant value. The resulting gain control factor is utilized to multiply a preset value of the audio output gain of the audio playback channel, thereby adjusting the audio playback signal level.

The present invention allows playback of audio signals recorded on parallel tracks extending across a length of a magnetic tape, while eliminating the disturbing repetitive reproduction of the audio signals at zero tape speed, and reducing the volume of such disturbing signals within a predetermined low tape speed range.

DETAILED DESCRIPTION

Figure 1:
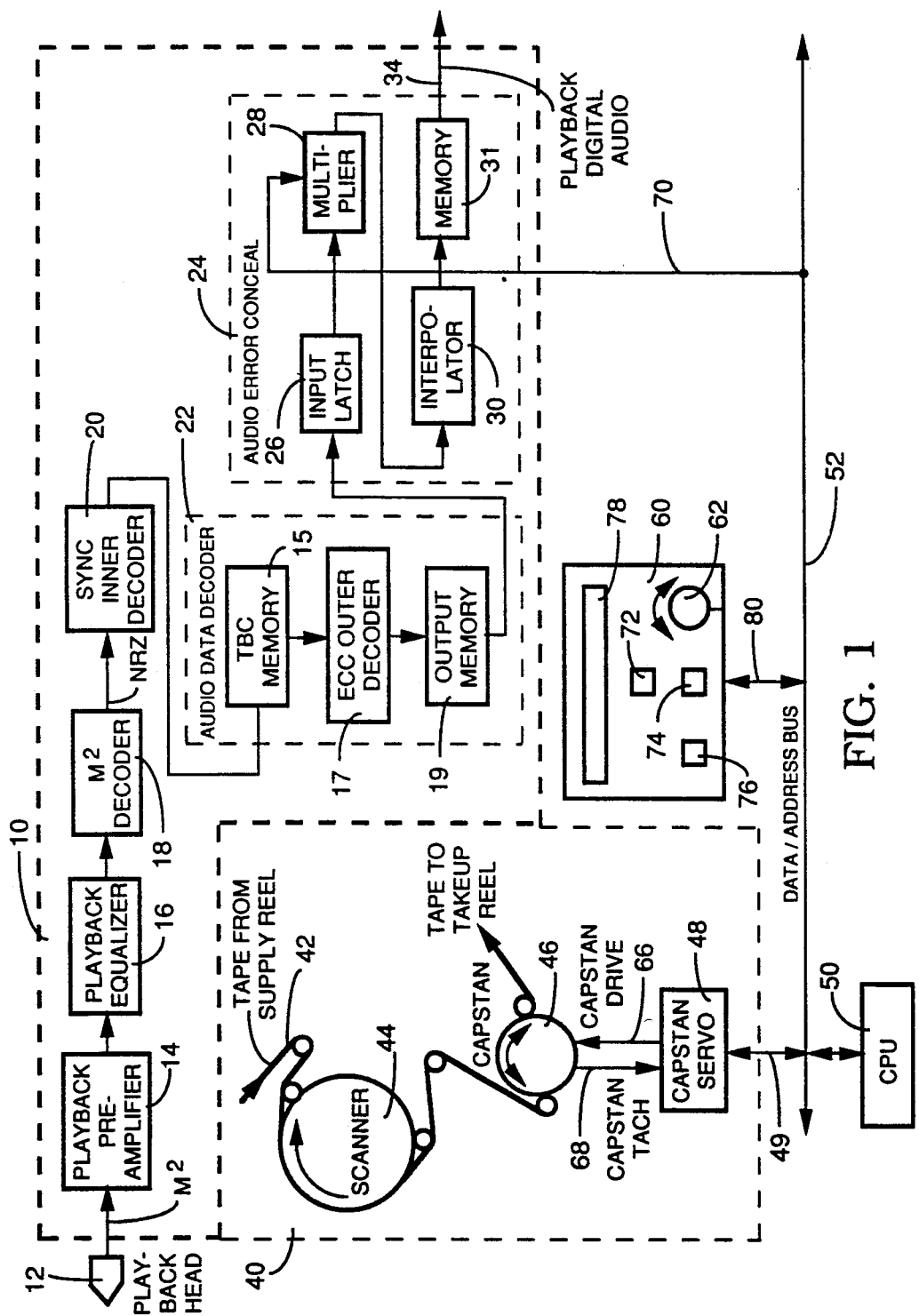
FIG. 1 shows an example of a functional block diagram depicting a portion of a microprocessor-controlled video tape playback apparatus, including a digital audio playback channel which is controlled in accordance with the preferred embodiment of the invention.

As an example, a portion of a microprocessor-controlled video tape playback apparatus is shown in the functional block diagram of FIG. 1. Particularly, there is shown a digital audio signal playback channel 10, portion of a tape transport 40, a microprocessor (CPU) 50, a data/address bus 52, and a control panel 60, of the type as utilized for example in a digital video signal tape recorder/playback device VPR-300, manufactured by Ampex Corporation. Details of that particular device are described in VPR-300 Series Video Production Recorder Service Manual, Volume I, Catalog No. 1520528-02, and VPR-300 Series Video Production Recorder Operation Manual, Catalog No. 1520527-02, both issued by Ampex Corporation, Redwood City, Calif., August 1989.

In addition, FIG. 1 shows an improvement provided in accordance with the preferred embodiment of the present invention, related to controlling the level of a digital audio playback signal obtained from playback channel 10, as it will follow from the detailed description below.

With further reference to FIG. 1, now the playback channel 10 will be described, as it is known from the above-referenced Manual, followed by the description of the playback audio output gain control provided by the present invention. A playback head 12 is utilized to reproduce a digital signal recorded in Miller Squared form along helical tracks on tape, and the signal from the head is applied to a playback amplifier 14. In the present example more than one rotating playback head is utilized, each associated with a playback channel, however only one head 12 and playback channel 10 is shown for simplicity. Each helical track contains digital data pertaining to both video and audio information signals. Control signals, such as sync, identification check bytes, and other are interspersed with the video and audio data on each track.

The Miller Squared playback data is further applied to a playback equalizer 16 and therefrom to a Miller Squared decoder 18. Decoder 18 decodes the Miller Squared data into non-return-to-zero (NRZ) data, and applies that data to a sync inner decoder 20. The sync inner decoder 20 arranges the playback data into bytes and generates a byte clock from the off-tape clock. It also detects the sync pattern, deformats the sync block data, and decodes the video and audio inner code blocks. The decoded video portion of the playback data is applied therefrom to a frame memory (not shown) for further processing.

The audio data portion from the sync inner decoder 20 is applied to an audio data decoder circuit 22. There the audio data is written into a time base correction (TBC) memory 15 at the off-tape clock rate, then read therefrom by read controls synchronous with the system clock to provide audio time base correction. The TBC memory 15 provides buffers (not shown) where the data is formatted for error correction/decoding purposes. The audio data and erasure flags from the TBC memory are applied to an error correction code (ECC) outer decoder 17. The decoder 17 corrects some of the errors in each code block and provides audio error flags for uncorrected data. The decoded/corrected data is written into an output memory 19 using shuffled addressing. The data from the output memory 19 of the audio data decoder 22 is deshuffled and is read out sequentially.

The audio data and audio error flags are routed to an audio error conceal circuit 24 whose main function is to provide error concealment for uncorrected errors to prevent audible pops and clicks. The input signal to circuit 24 is reclocked by an input latch 26. The output data from latch 26 is routed to the processing circuits consisting of multiplier 28, interpolator 30, and memory 31. The multiplier 28 performs a digital gain adjustment function. It multiplies each received 16-bit audio sample by a 16-bit gain adjustment control signal received from CPU 50 via bus 52 and line 70. Interpolator 30 performs concealment of data flagged by the audio data decoder 22 as uncorrectable. It processes adjacent data samples, and derives estimates for the flagged data samples. The interpolated data is then used instead of the erroneous samples. Memory 31 stores processed audio samples for a time needed to match processing delays of audio and video data. The stored playback digital audio data from memory 31 is routed via line 34 to an audio output circuit (not shown) for further use.

The above-described example of a known digital audio playback channel is described in detail in the above-referenced Service Manual, with reference to a block diagram shown therein in FIG. 4-1, pages 4-3 and 4-4.

Generally, before or during playback operation, the operator presets a desired audio output gain at the control panel 60, shown in FIG. 1 of the attached drawings, and that preset gain is applied from the control panel 60 to CPU 50 via line 80 and bus 52. The CPU 50 applies a corresponding gain control signal via bus 52 and line 70 to the multiplier 28, to thereby adjust the audio output gain. Adjusting audio output gain of the playback channel is understood as changing the amplitude of the original audio playback information signal, which may be represented for example by digital data or a frequency modulated signal. In the presently described example the audio output gain control signal is provided as a digital control signal applied from the CPU 50 to the multiplier 28 via bus 52 and line 70. The device for adjusting the audio output gain is implemented by the digital multiplier 28, which multiplies 16-bit audio samples by a 16-bit audio gain control signal.

The CPU 50 also receives information about the actual tape speed from the tape transport via line 49 and data/address bus 52. In accordance with the preferred embodiment of the invention, based on that actual tape speed, the CPU 50 calculates a gain control factor (GCF), and it multiplies thereby the amount of preset gain from the control panel. The thusly modified gain control signal is then applied to the multiplier 28, to control the gain at the output of the digital audio signal channel, as it will follow from further description.

As it is seen from the portion 40 of the tape transport depicted in FIG. 1, the tape 42 is wrapped around a rotating scanner drum 44. The scanner drum 44 has two sets of magnetic recording/playback heads, of which only one playback head 12 is shown in FIG. 1, as being connected to the playback channel 10. As it is well known in the art, these heads are mounted on the periphery of the scanner drum 44, and they record/playback information along helical tracks on the tape in a well known manner. The tape 42 is advanced by a capstan 46, which in turn is driven by a DC motor (not shown) in a well known manner. A capstan servo 48 which operates as a position servo, controls the motion of the capstan. The capstan 46 controls the tape speed through the transport in all modes of operation.

Actual tape speed is calculated by the CPU 50 in a conventional manner from capstan tach information received from capstan servo 48 via line 49 and bus 52. A block diagram of a corresponding portion of the tape transport servo board is shown in FIG. 5-54, page 5-119 of the above-referenced Service Manual.

Figure 2:
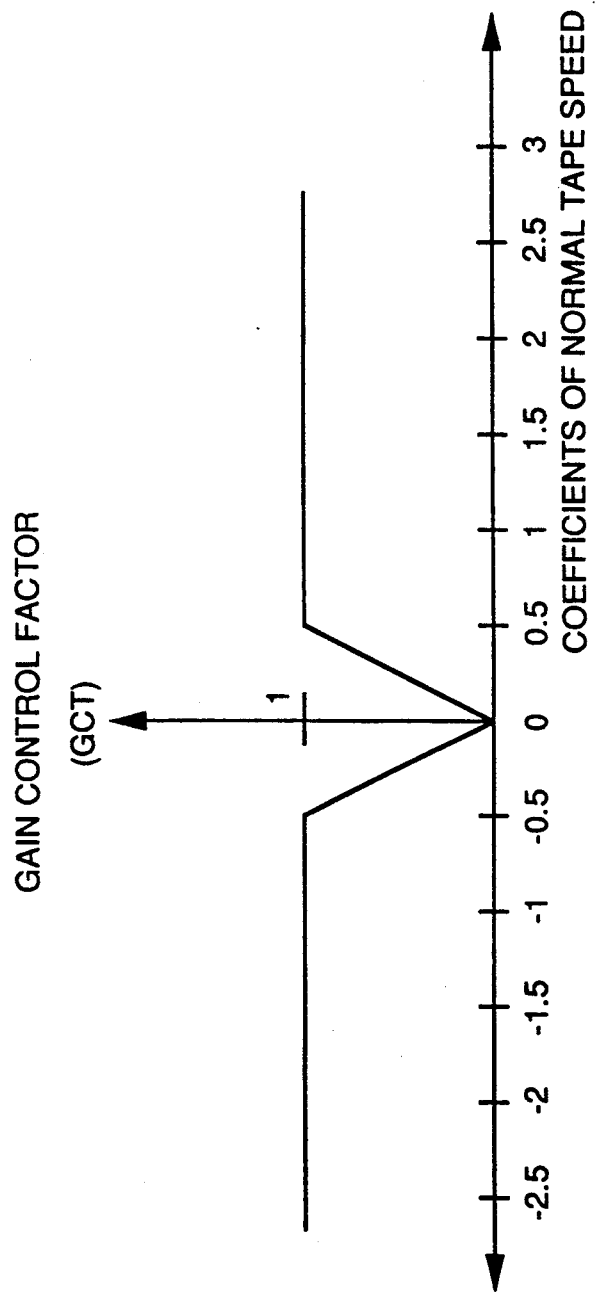
FIG. 2 shows an example of a gain control factor characteristic, as being dependent on longitudinal tape speed, in accordance with the preferred embodiment of the invention.

Now the manner of calculating the gain control factor (GCF) in accordance with the preferred embodiment of the invention will be described. The characteristic of FIG. 2 shows gain control factor (GCF) values as being dependent on tape speed. The positive and negative tape speed values correspond to the tape speed in forward and reverse direction, respectively. In this example, the tape speed values are indicated as coefficients of the normal tape speed, that is of the tape speed at which the original recording was made. Thus the magnitude of tape speed equal to 1 indicates the normal tape speed, the magnitude of tape speed equal to 2 indicates twice the normal tape speed, etc. It will be understood, that as an alternative, tape speed values in inch/second may be plotted directly along the horizontal axis of the characteristic of FIG. 2, while the shape of the characteristic will remain unchanged.

In accordance with the preferred embodiment of the invention, the GCF is utilized by the CPU 50 to multiply the audio output gain which is preset by the operator. The thusly modified audio output gain value is applied from the CPU 50 via the bus 52 and line 70 to the multiplier 28. It is seen from the characteristic of FIG. 2, that a zero tape speed GCF=0. That is, when the tape is stopped, that audio output gain value applied on line 70 from the CPU 50 of FIG. 1 to the multiplier 28 causes to reduce the audio output signal level at the output 34 of the audio channel 10 to zero. As a result, there is no audible signal played back from the digital audio playback channel.

It is further seen from FIG. 2 that within a predetermined low range of tape speed, and with increasing tape speed, GCF increases to a predetermined value, whereafter it remains constant. In the preferred embodiment GCF increases linearly from 0 to 1 within a tape speed range from 0 to ½ of normal tape speed in both directions of tape movement.

Thus when the tape moves below ½ of the normal speed, the playback audio signal level is reduced with decreasing tape speed in each direction of movement. In the characteristic of FIG. 2 there is a linear relationship between the tape speed and gain control factor. Alternatively, the characteristic may have other shapes, such as changing step-wise or exponentially. Generally the shape of that characteristic is not critical. It is important however, that to obtain a desired suppression of playback audio signal level at zero and very low tape speed, the characteristic has a zero gain control factor at zero tape speed, and an increasing value with increasing tape speed magnitude up to a selected tape speed value, in either direction of tape movement, and thereafter that factor remains constant, preferably equal to one.

In the preferred embodiment the "elbow" of the characteristic in FIG. 2 has been selected experimentally at ½ of normal tape speed. It is apparent, however, that different elbow values may be selected instead, to satisfy the needs and preferences of the editing operator. For example, when an exponentially increasing characteristic is selected, it will have no elbow, and it will approach the selected constant GCF value asymptotically.

It follows from the foregoing description with reference to FIG. 2, that when the tape is moving at a very slow speed, there is a desired reduction in the gain of the audio signal playback channel, while the amount of reduction is dependent on the magnitude of tape speed. The advantage of the foregoing feature of the invention is that the operator can hear the audio signal, as it is necessary during editing operation, but at a reduced volume. When the control factor becomes equal to one, it no longer influences the gain of the playback channel.

The control panel 60 of FIG. 1 has arranged thereon among other elements a control knob 62, control buttons JOG 72, VAR 74, STOP 76, and a display screen 78. As it is well known in the art, in jog mode, when the JOG button 72 is pressed, and the operator manually turns control knob 62 in either direction, the direction as well as the speed of rotation of the knob is translated to capstan servo 48, while the capstan directly follows the movement of the knob. The movement of the capstan in turn results in tape movement as it is well known. In this mode of operation the rotational speed of the control knob 62 determines the speed and direction of tape movement, and the angular position of the control knob corresponds to that of the capstan. As an example, in the jog mode the control knob 62 may be turned in either direction to advance or reverse the tape movement one or more television frame or field at a time.

In another well known operation mode, generally referred to as variable speed playback, when the VAR button 74 on control panel 60 is pressed, the capstan 46 is moving, while the control knob 62 may be turned in either direction to control the direction and speed of the capstan movement. When the knob 62 is in "zero" position, the tape is stopped. When the knob 62 is turned past the zero position in one direction, the tape moves in one direction at a speed proportional to the angular displacement of the knob with reference to the zero position. When the knob is turned in the opposite direction past the zero position, the tape moves in opposite direction. Thus by manually turning the knob 62, the tape speed may be controlled, depending on the direction of the knob movement with respect to the zero position. When the STOP button 76 is pressed, tape movement stops, as it may also be obtained by no control knob movement in jog mode, or by setting the control knob 62 to zero position in variable speed playback mode. The screen 78 on the control panel 60 displays the tape speed and direction in all above-described modes of operation.

To provide a more detailed description, the manner of calculating the actual tape speed by the CPU 50 will be now described. The actual tape speed is calculated from a detected capstan tach signal, which in turn is generated by the rotating capstan 46 in a well known manner. The capstan tach signal on line 68 is applied to capstan servo 48, which contains a counter (not shown) counting clock pulses at constant frequency. Each capstan tach pulse latches the counter value and resets the counter. The latched counter value represents a capstan tach period. That value is read by the CPU 50 via the data/address bus 52 and line 49. The CPU 50 calculates the capstan velocity from the obtained value. In the jog and variable play modes the tape is driven by the capstan, and therefore capstan velocity also represents the tape speed. The result of the tape velocity calculation by the CPU 50 is a 16-bit number representing the actual tape speed value as a multiple of normal tape speed.

In accordance with the preferred embodiment of the invention, the CPU 50 is programmed to calculate the gain control factor as a function of thusly obtained actual tape speed values, in accordance with the characteristic of FIG. 2, as it has been previously described. The CPU 50 is further programmed to multiply the audio output gain of the playback channel, which has been preset by the operator, by the gain multiplication factor. The CPU 50 then applies the resulting modified gain control signal to adjust the gain of the audio playback channel. Consequently, at zero tape velocity the gain is equal to zero, and therefore level of the audio playback signal on line 34 is set to zero. When the tape starts moving, the gain increases proportionally, and at ½ of normal play speed it reaches full value of the audio output gain which has been previously set by the operator.

Every time when the tape velocity changes, and it causes the GCF value to change, in accordance with the characteristic of FIG. 2, a new gain control signal value is calculated by the CPU 50, and applied via bus 52 and line 70 to multiplier 28, which provides the actual gain adjustment. The foregoing results in a reduction of audio output signal level on line 34, which is dependent on the tape speed within a predetermined low range of tape speed. When the tape speed exceeds that range, there is no reduction in the audio signal level.

Although the invention has been fully described by way of example with reference to the accompanying drawings, it is noted that various changes and modifications will be apparent to those skilled in the art. Therefore, unless such changes and modifications depart from the scope of the invention, they should be construed as being included within the scope of the appended claims.

I claim:

1. An apparatus for reproducing audio signals recorded on parallel tracks extending across a length of a magnetic tape, said apparatus having at least one playback head for scanning said parallel tracks, an audio playback channel associated with said playback head, and means for adjusting an audio output gain of said audio playback channel, comprising:

means for detecting a longitudinal speed of said magnetic tape and for providing a detected magnetic tape speed; and means for providing a gain control signal dependent on said detected magnetic tape speed, and applying said gain control signal to said means for adjusting said audio output gain, said gain control signal reducing said audio output gain substantially to zero when said detected magnetic tape speed is zero, changing said audio output gain with a changing magnitude of said detected magnetic tape speed between zero and a predetermined magnetic tape speed magnitude, and providing a constant audio output gain when said detected magnetic tape speed exceeds said predetermined magnetic tape speed magnitude.

2. An apparatus for reproducing audio signals recorded on helical tracks of a magnetic tape, said apparatus having at least one rotating playback head, an audio signal playback channel associated with said playback head, and means for adjusting an audio output gain of said audio playback channel, comprising:

means for detecting a longitudinal speed of said magnetic tape and for providing a detected magnetic tape speed; and control means receiving information related to said detected magnetic tape speed, and providing responsively a gain control factor which is dependent on said detected magnetic tape speed, said gain control factor being equal to zero when said detected magnetic tape speed is zero, said gain control factor increasing with an increasing magnitude of said detected magnetic tape speed from zero to a predetermined magnetic tape speed magnitude, and said gain control factor being equal to a predetermined constant value when said magnitude of said detected magnetic tape speed exceeds said predetermined magnetic tape speed magnitude, said control means modifying a preset audio output gain of said audio playback channel by said gain control factor, to obtain a gain control signal, and applying said gain control signal to said means for adjusting said audio output gain of said audio playback channel.

3. The apparatus of claim 2 wherein said audio playback channel is a digital signal channel, and wherein said means for adjusting said audio output gain is a digital signal multiplier.

4. The apparatus of claim 2 wherein said control means comprises a programmable control means which is programmed to calculate said gain control factor as being dependent on said detected magnetic tape speed, and to multiply said preset audio output gain of said audio playback channel by said gain control factor to obtain said gain control signal.

5. The apparatus of claim 2 wherein said gain control factor is linearly increasing with an increasing magnitude of said detected magnetic tape speed.

6. The apparatus of claim 2 wherein predetermined constant value of said gain control factor is equal to one.

7. A method of reproducing audio signals recorded on parallel tracks extending across a length of a magnetic tape, utilizing a magnetic recording/playback device having at least one playback head for scanning said parallel tracks, an audio playback channel associated with said playback head, and means for adjusting an audio output gain of said audio output channel, comprising the steps of:

detecting a longitudinal speed of said magnetic tape during playback;

providing a detected magnetic tape speed;

providing a gain control signal which is dependent on said detected magnetic tape speed, said gain control signal reducing said audio output gain substantially to zero when said detected magnetic tape speed is zero, changing said audio output gain with a changing magnitude of said detected magnetic tape speed between zero and a predetermined magnetic tape speed magnitude, and providing a constant gain of said channel when said detected magnetic tape speed exceeds said predetermined magnetic tape speed magnitude; and applying said gain control signal to said means for adjusting said audio output gain of said audio playback channel.

8. A method of reproducing audio signals recorded on helical tracks of a magnetic tape, utilizing a magnetic recording/playback device having at least one rotating playback head, an audio playback channel associated with said playback head, and means for adjusting an audio output gain of said audio playback channel, comprising the steps of:

detecting a longitudinal speed of said magnetic tape during playback;

providing a detected magnetic tape speed;

providing a gain control factor dependent on said detected magnetic tape speed, said gain control factor being equal to zero when said detected magnetic tape speed is zero, said gain control factor changing with a changing magnitude of said detected magnetic tape speed between zero and a predetermined magnetic tape speed magnitude, and said gain control factor being equal to a predetermined constant when said magnitude of said detected magnetic tape speed exceeds said predetermined magnetic tape speed magnitude;

modifying a preset audio output gain of said audio playback channel by said gain control factor to obtain a gain control signal; and applying said gain control signal to said means for adjusting said audio output gain, to control a level of said audio signal obtained from said playback channel.

9. The method of claim 8 wherein said gain control factor is linearly changing with said detected tape speed magnitude.

10. The method of claim 8 wherein said predetermined constant of said gain control factor is equal to one.

11. The method of claim 8 wherein said step of modifying comprises multiplying said preset audio output gain by said gain control factor.

* * * * *